US012725519B2

(12) United States Patent
Ogawa et al.

(10) Patent No.: US 12,725,519 B2
(45) Date of Patent: Sep. 1, 2026

(54) TRANSPORT FACILITY

(71) Applicant: Daifuku Co., Ltd., Osaka (JP)

(72) Inventors: Daisuke Ogawa, Hinocho (JP); Yuya Hirao, Hinocho (JP); Tatsuki Ii, Hinocho (JP); Tomoaki Nishikawa, Hinocho (JP); Kouji Ueba, Hinocho (JP); Kosuke Sakamoto, Hinocho (JP); Kosuke Kimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/776,337

(22) Filed: Jul. 18, 2024

(65) Prior Publication Data

US 2025/0029492 A1 Jan. 23, 2025

(51) Int. Cl.
*G08G 1/13* (2006.01)

(52) U.S. Cl.
CPC .................................... *G08G 1/13* (2013.01)

(58) Field of Classification Search
CPC . G06Q 10/0833; G06Q 10/0834; G01S 19/13
USPC ........................................................ 705/330
See application file for complete search history.

(56) References Cited

U.S. PATENT DOCUMENTS

| | | | | |
|---|---|---|---|---|
| 11,013,385 B2 | 5/2021 | Xue et al. | | |
| 2019/0139164 A1* | 5/2019 | Shike | .................... | H04W 4/029 |

FOREIGN PATENT DOCUMENTS

| | | | |
|---|---|---|---|
| JP | 2008103882 A | 5/2008 |
| JP | 2009123061 A | 6/2009 |
| JP | 2011166671 A | 8/2011 |
| JP | 201836865 A | 3/2018 |
| JP | 2019505256 A | 2/2019 |

OTHER PUBLICATIONS

"Intelligent Vehicle Monitoring System using Wireless Communication" Published by IEEE (Year: 2013).*

* cited by examiner

*Primary Examiner* — Zeina Elchanti
(74) *Attorney, Agent, or Firm* — The Webb Law Firm

(57) ABSTRACT

A transport facility includes a monitoring system. The monitoring system includes a travel data obtainer, a connection data obtainer, a display, and a controller. The travel data obtainer obtains travel data including position information and time information in a manner associated with each other. The position information indicates a position of a transport vehicle. The connection data obtainer obtains connection data including connection destination information and the time information in a manner associated with each other. The connection destination information indicates a relationship between a vehicle communicator and a destination wireless transmitter-receiver to which the vehicle communicator is connected. The controller performs a display process of causing the display to display connection information based on the travel data and the connection data. The connection information indicates a relationship between the position of the transport vehicle and the destination wireless transmitter-receiver to which the transport vehicle is connected at the position.

11 Claims, 6 Drawing Sheets

TRANSPORT FACILITY

CROSS-REFERENCE TO RELATED APPLICATION

This application claims priority to Japanese Patent Application No. 2023-117609 filed Jul. 19, 2023, the disclosure of which is hereby incorporated by reference in its entirety.

BACKGROUND OF THE INVENTION

Field of the Invention

The present invention relates to a transport facility including a transport vehicle that transports transport articles, a transport control device that controls the transport vehicle, and a communication system that allows communication between the transport vehicle and the transport control device.

Description of Related Art

An example of such a transport facility is described in Japanese Unexamined Patent Application Publication No. 2011-166671 (Patent Literature 1). In the background described hereafter, reference signs in parentheses are the reference signs in Patent Literature 1. The transport facility described in Patent Literature 1 includes a traveling vehicle (12) for transporting articles, a system server (18) for controlling the traveling vehicle (12), and a communication system that allows communication between the traveling vehicle (12) and the system server (18). The communication system includes multiple access points (8) for wireless communication with the traveling vehicle (12). The multiple access points (8) and the system server (18) are connected with a ground local area network or LAN (14) to allow communication. The multiple access points (8) are distributed. The traveling vehicle (12) travels while switching the access points (8) as a connection destination.

SUMMARY OF THE INVENTION

Wireless communication is typically more susceptible to the surrounding environment such as obstacles and radio interference than wired communication. Thus, the actual status of communication between the transport vehicle and a wireless transmitter-receiver is to be tracked to improve the wireless communication environment including multiple wireless transmitter-receivers (access points in Patent Literature 1). Tracking the actual status of communication between the transport vehicle and the wireless transmitter-receiver allows, for example, the wireless transmitter-receiver to be restarted, or the installation position to be changed, replaced, or added to maintain or improve an appropriate wireless communication environment. The degree by which wireless communication is affected by the surrounding environment or whether wireless communication is affected changes depending on changes in the layout or system configuration of the transport facility. The actual status of communication between the transport vehicle and the wireless transmitter-receiver may thus be tracked both at the time of installation of the transport facility and subsequently. Thus, such tracking of the actual status of communication between the transport vehicle and the wireless transmitter-receiver is to be performed easily.

One or more aspects are directed to techniques for easily tracking the actual status of communication between the transport vehicle and the wireless transmitter-receiver.

A transport facility according to an aspect of the disclosure includes at least one transport vehicle that transports a transport article, a transport control device that communicates with the at least one transport vehicle to control the at least one transport vehicle, a communication system that allows communication between the at least one transport vehicle and the transport control device, and a monitoring system that monitors a status of the communication system. The communication system includes a plurality of wireless transmitter-receivers that wirelessly communicate with a vehicle communicator in the at least one transport vehicle. The communication system connects the plurality of wireless transmitter-receivers to the transport control device to allow communication with the transport control device. The monitoring system includes a travel data obtainer, a connection data obtainer, a display that displays information, and a controller. The travel data obtainer obtains travel data including position information and time information in a manner associated with each other. The position information indicates a position of the at least one transport vehicle. The time information indicates time. The connection data obtainer obtains connection data including connection destination information and the time information in a manner associated with each other. The connection destination information indicates a relationship between the vehicle communicator and a destination wireless transmitter-receiver to which the vehicle communicator is connected. The destination wireless transmitter-receiver is included in the plurality of wireless transmitter-receivers. The controller performs a display process of causing the display to display connection information based on the travel data and the connection data. The connection information indicates a relationship between the position of the at least one transport vehicle and the destination wireless transmitter-receiver to which the at least one transport vehicle is connected at the position.

This structure allows the position information included in the travel data and the connection destination information included in the connection data to be associated with each other based on the time information. The controller can thus generate the connection information based on such travel data and connection data. The connection information displayed on the display through the display process performed by the controller indicates the relationship between the position of the transport vehicle and the destination wireless transmitter-receiver to which the transport vehicle is connected at the position. Thus, a person viewing the display can easily track, as the actual status of communication between the transport vehicle and the wireless transmitter-receiver, the position of the connected transport vehicle and the wireless transmitter-receiver to which the transport vehicle is connected. The technique according to this structure allows easy tracking of the actual status of communication between the transport vehicle and the wireless transmitter-receiver.

Further aspects and features of the transport facility will be apparent from embodiments described below with reference to the drawings.

DESCRIPTION OF THE INVENTION

Figure 2:
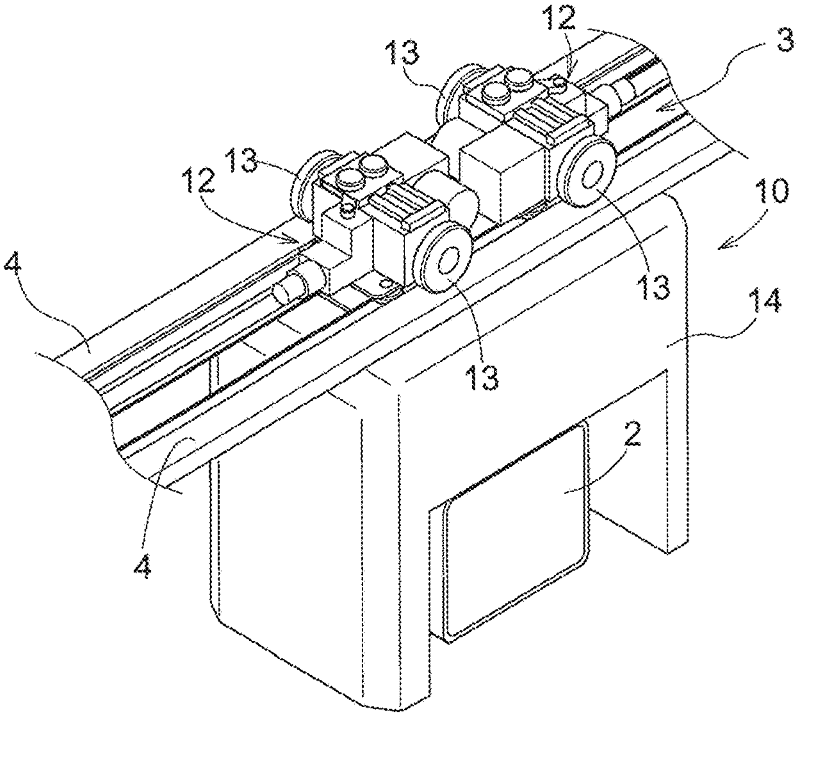
FIG. 2 is a diagram of an example transport vehicle.
Figure 3:
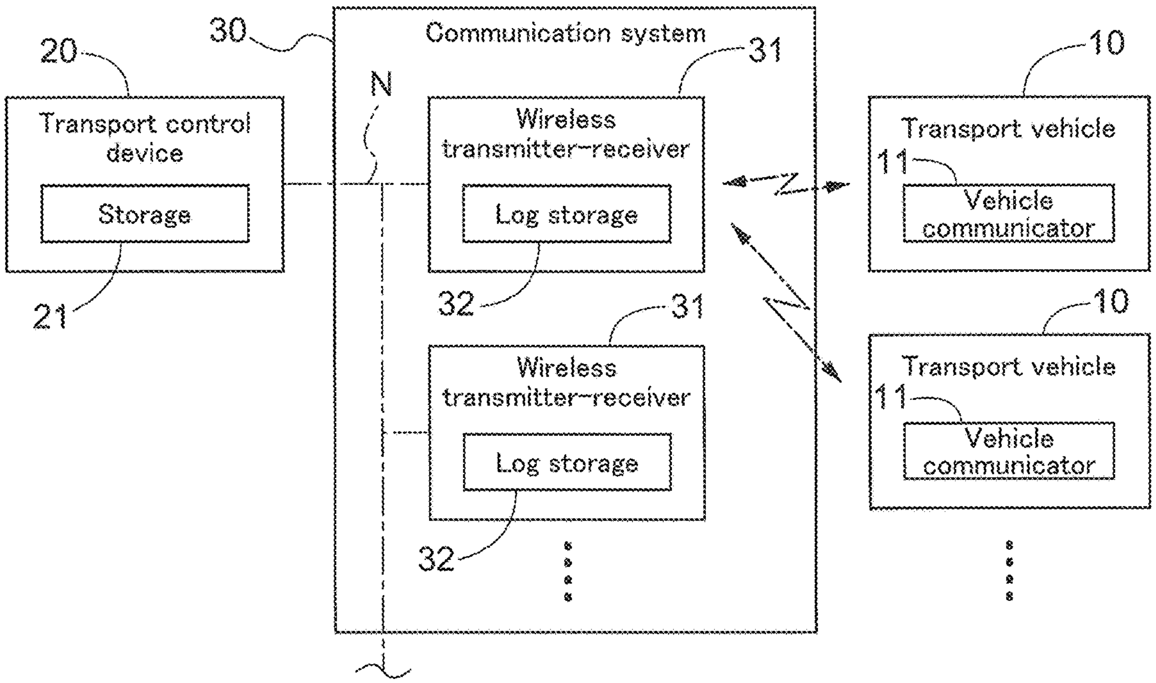
FIG. 3 is a block diagram of a transport facility according to an embodiment.
Figure 4:
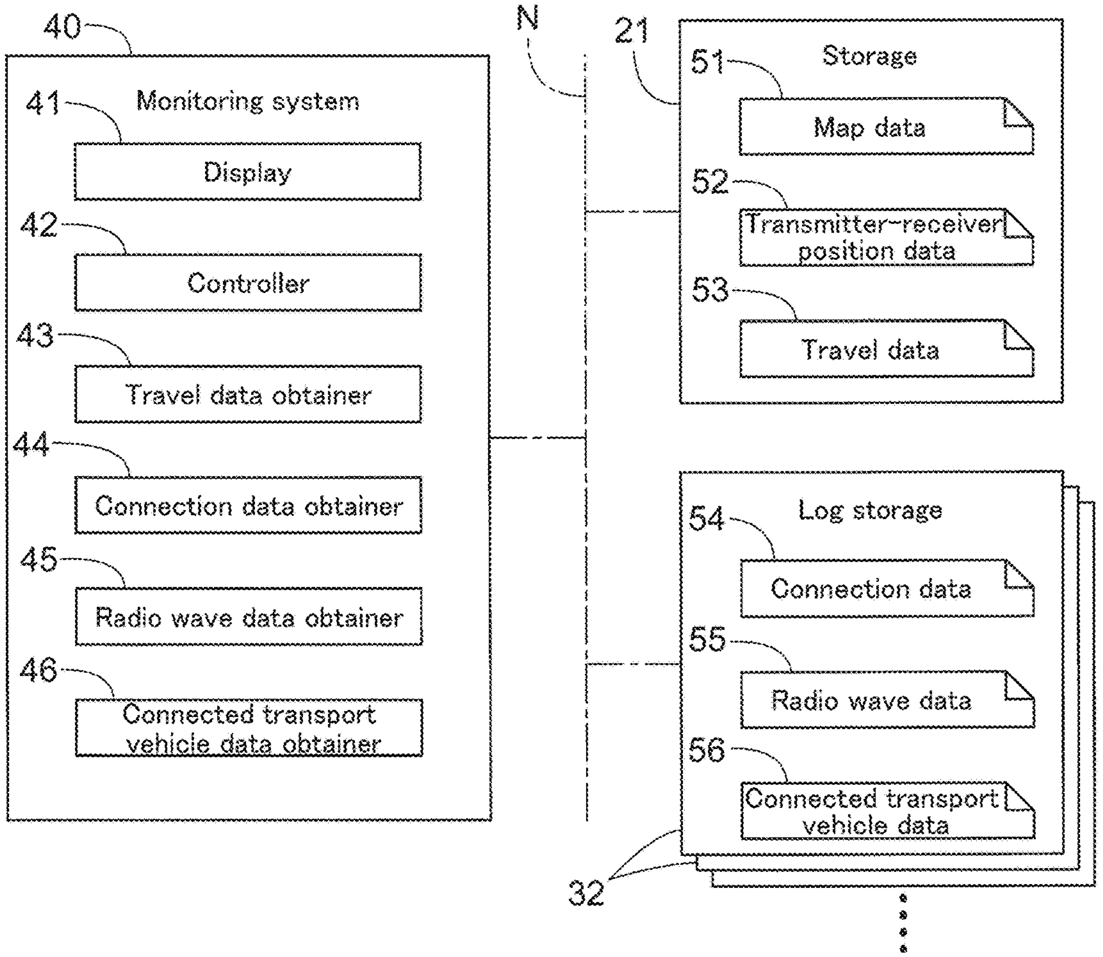
FIG. 4 is a block diagram of a monitoring system according to the embodiment.

A transport facility according to one or more embodiments will be described with reference to the drawings. As shown in FIGS. 3 and 4, a transport facility 1 includes transport vehicles 10, a transport control device 20, a communication system 30, and a monitoring system 40. As shown in FIG. 2, each transport vehicle 10 transports a transport article 2. The transport article 2 is, for example, a front opening unified pod (FOUP) containing semiconductor wafers. In the present embodiment, the transport facility 1 includes multiple transport vehicles 10.

The transport vehicles 10 (automated guided vehicles in this example) each travel along a travel path 3 to transport a transport article 2. A controller (not shown) in the transport vehicle 10 controls the operation of the transport vehicles 10 (e.g., the traveling operation and the transferring operation of the transport article 2) in response to a command from the transport control device 20. In the example shown in FIG. 1, the travel path 3 passes through a processing device 5 designed to process the transport article 2 (or an object contained in the transport article 2). For example, the transport vehicle 10 loads the transport article 2 to be processed in the processing device 5 to the processing device 5, and unloads the transport article 2 processed in the processing device 5 from the processing device 5.

The transport vehicle 10 illustrated in FIG. 2 has the structure described below. The transport vehicle 10 includes a traveler 12 that travels along the travel path 3 and a body 14 connected to the traveler 12. The travel path 3 includes rails 4 (a pair of rails 4 spaced from each other in the horizontal direction in this example). The transport article 2 is accommodated in the body 14 and transported by the transport vehicle 10. The traveler 12 includes travel wheels 13 that roll on travel surfaces (upper surfaces in this example) of the rails 4. The travel wheels 13 are driven by a travel wheel driver (e.g., an electric motor such as a servomotor; not shown) to rotate, thus causing the traveler 12 to travel along the rails 4.

In the example shown in FIG. 2, the transport vehicle 10 is a ceiling-hung transport vehicle that travels along the rails 4 hung from and supported by the ceiling. However, the transport vehicle 10 may be of another type. For example, the transport vehicle 10 may be a tracked transport vehicle that travels along the rails on the floor surface. The transport vehicle 10 may also be a trackless transport vehicle such as an automated guided vehicle (AGV) or an autonomous mobile robot (AMR). The transport vehicle 10 being a trackless transport vehicle travels along a virtual travel path 3 rather than a physical travel path 3 that includes rails or other members. For example, multiple detectable members such as two-dimensional (2D) codes and radio frequency (RF) tags are installed on the floor surface, and the travel path 3 is virtually defined to connect the multiple detectable members. The travel path 3 may also be virtually defined, without such detectable members on the floor surface, based on a route calculated using recognition results of the surrounding environment.

The transport control device 20 communicates with the transport vehicle 10 to control the transport vehicle 10. The transport control device 20 includes, for example, an arithmetic processor such as a central processing unit (CPU) and a peripheral circuit such as a memory. The functions of the transport control device 20 are implemented by, for example, hardware such as an arithmetic processor and a program executable on the hardware operating in cooperation with each other. As shown in FIG. 3, the transport control device 20 includes a storage 21. The storage 21 includes a storage medium that stores and rewrites information. Examples of the storage 21 and a log storage 32 (described later) includes a flash memory and a hard disk drive.

The transport control device 20 may be implemented by multiple devices that can communicate with each other, rather than a single device. For example, when the area traveled by the transport vehicle 10 is divided into multiple section areas for management, the transport control device 20 may include multiple section controllers that manage different section areas. The storage 21 in the transport control device 20 and the devices other than the storage 21 in the transport control device 20 may be different devices. In this case, the storage 21 is disposed, for example, on a server or a cloud server that can communicate with devices other than the storage 21 in the transport control device 20.

The communication system 30 allows communication between the transport vehicle 10 and the transport control device 20. The communication system 30 includes, for example, all components for communication between the transport vehicle 10 and the transport control device 20 (excluding a vehicle communicator 11 described later). The transport vehicle 10, the transport control device 20, and the communication system 30 (more specifically, a wireless transmitter-receiver 31 described below) may be synchronized and have common time information.

As shown in FIG. 3, the communication system 30 includes multiple wireless transmitter-receivers 31 that wirelessly communicate with the vehicle communicator 11 in the transport vehicle 10. The multiple wireless transmitter-receivers 31 are connected to the transport control device 20 to allow communication. In other words, the communication system 30 includes the multiple wireless transmitter-receivers 31 and a device for establishing a communication network N between the multiple wireless transmitter-receivers 31 and the transport control device 20. The communication network N may be wired, wireless, or a combination of both. When the communication network Nis established using a wired local area network (LAN), the communication system 30 includes, for example, a LAN cable or a hub as a device for establishing the communication network N.

The wireless transmitter-receivers 31 relay communication between the transport vehicle 10 and the transport control device 20. The wireless transmitter-receivers 31 are devices referred to as access points. The wireless transmitter-receivers 31 include the log storage 32 that stores a log (communication log) associated with communication with the vehicle communicator 11. The wireless transmitter-receivers 31 communicate with the vehicle communicator 11 using radio waves. Electromagnetic waves used for wireless communication are herein referred to as radio waves. Radio waves are not limited to electromagnetic waves in a specific frequency band. In the present embodiment, radio waves in an example are electromagnetic waves with frequencies used in wireless LANs.

Figure 1:
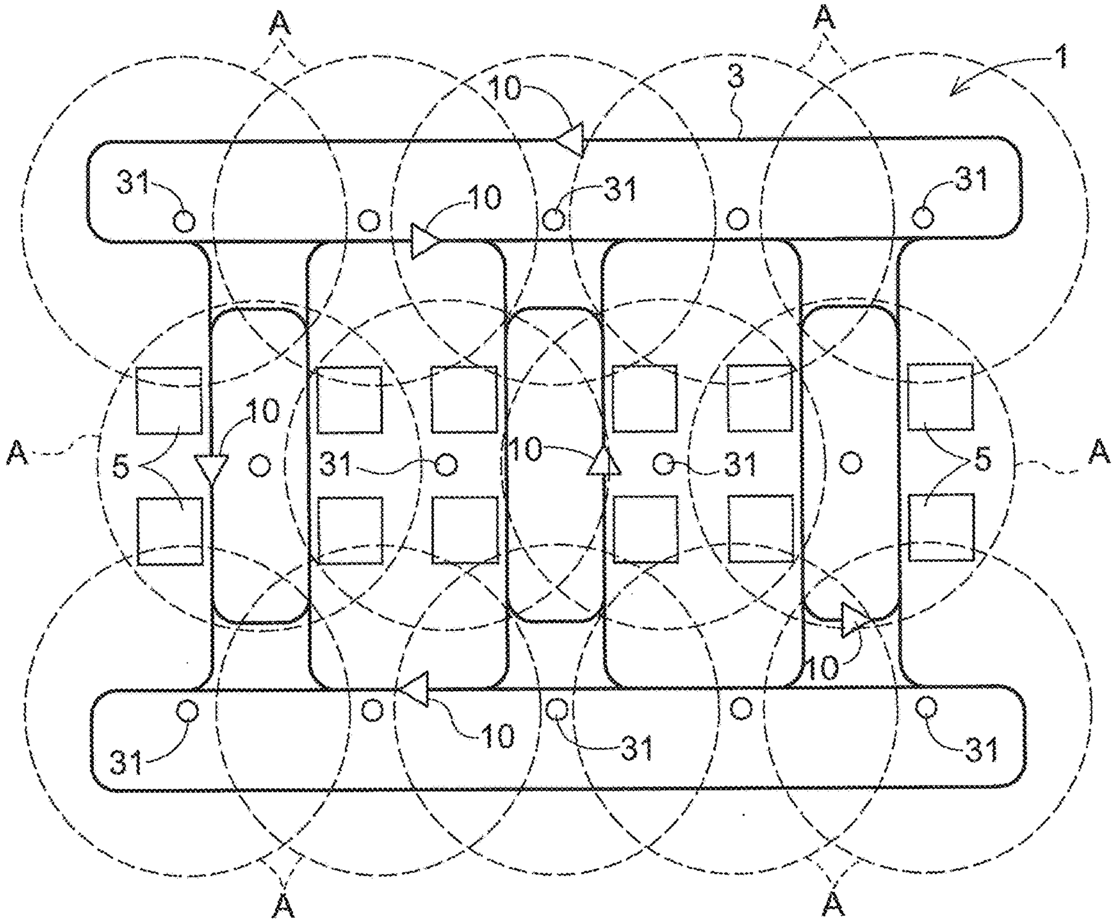
FIG. 1 is a diagram of an example layout of a travel path of a transport vehicle.
Figure 6:
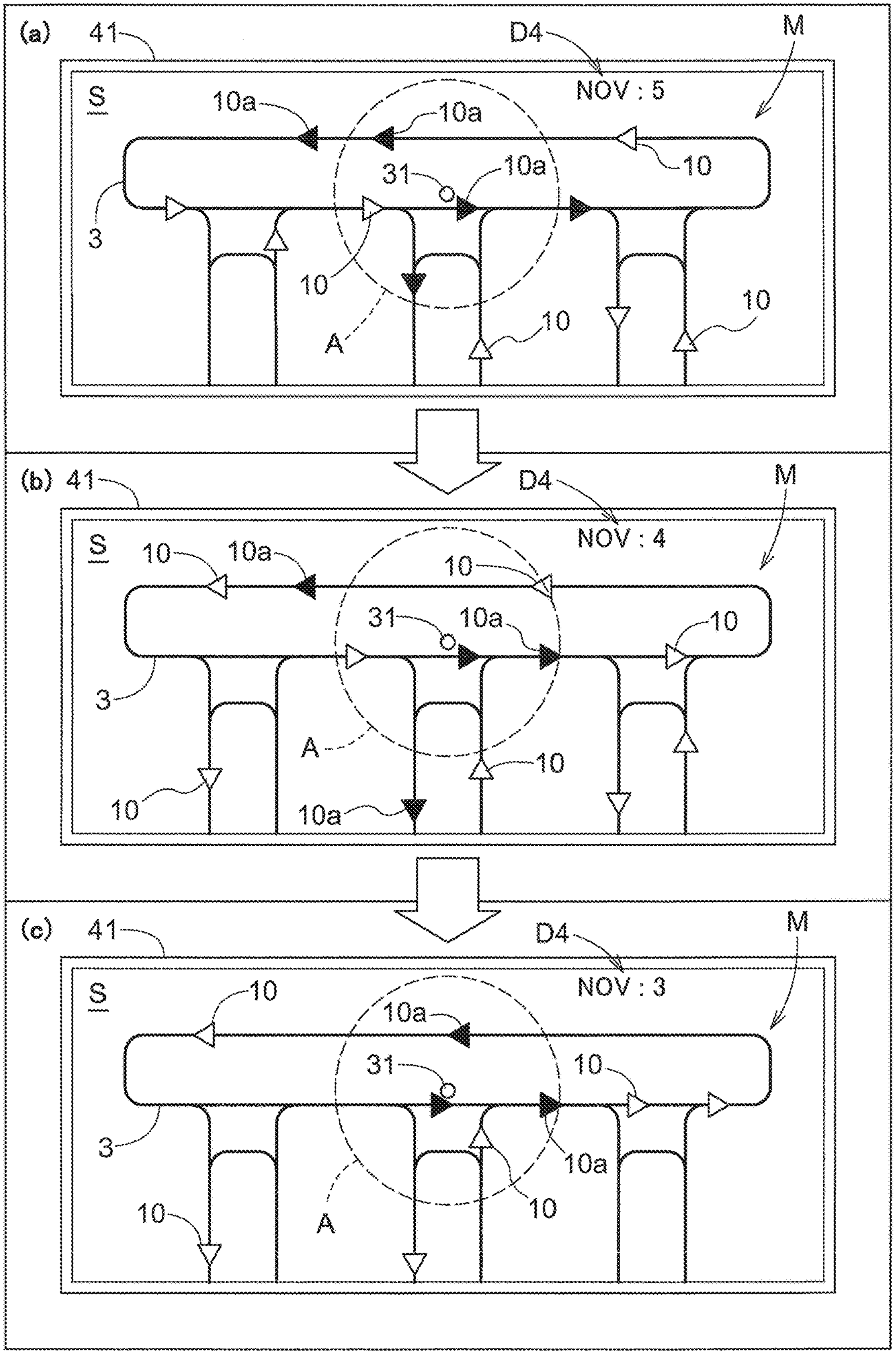
FIG. 6 is a diagram of other example images displayed on the display through the display process.

As shown in FIG. 1, the multiple wireless transmitter-receivers 31 are distributed throughout the area in which the transport vehicles 10 travel. The wireless transmitter-receivers 31 are disposed in the respective communication areas A that partially overlap one another. The communication areas A are each an area in which the radio wave intensity of the wireless transmitter-receivers 31 is equal to or greater than a predetermined value. FIG. 1 shows the communication areas A of the wireless transmitter-receivers 31 as circles centered at the respective wireless transmitter-receivers 31. Each circle indicating the corresponding communication area A of the wireless transmitter-receiver 31 has a radius shorter than a maximum distance for communication between the wireless transmitter-receiver 31 and the vehicle communicator 11. As shown in FIG. 6(*a*) referred to later, the transport vehicles 10 (connected transport vehicles 10*a* in the figure) in connection with the wireless transmitter-receiver 31 may be outside the communication area A of the wireless transmitter-receiver 31.

Figure 5:
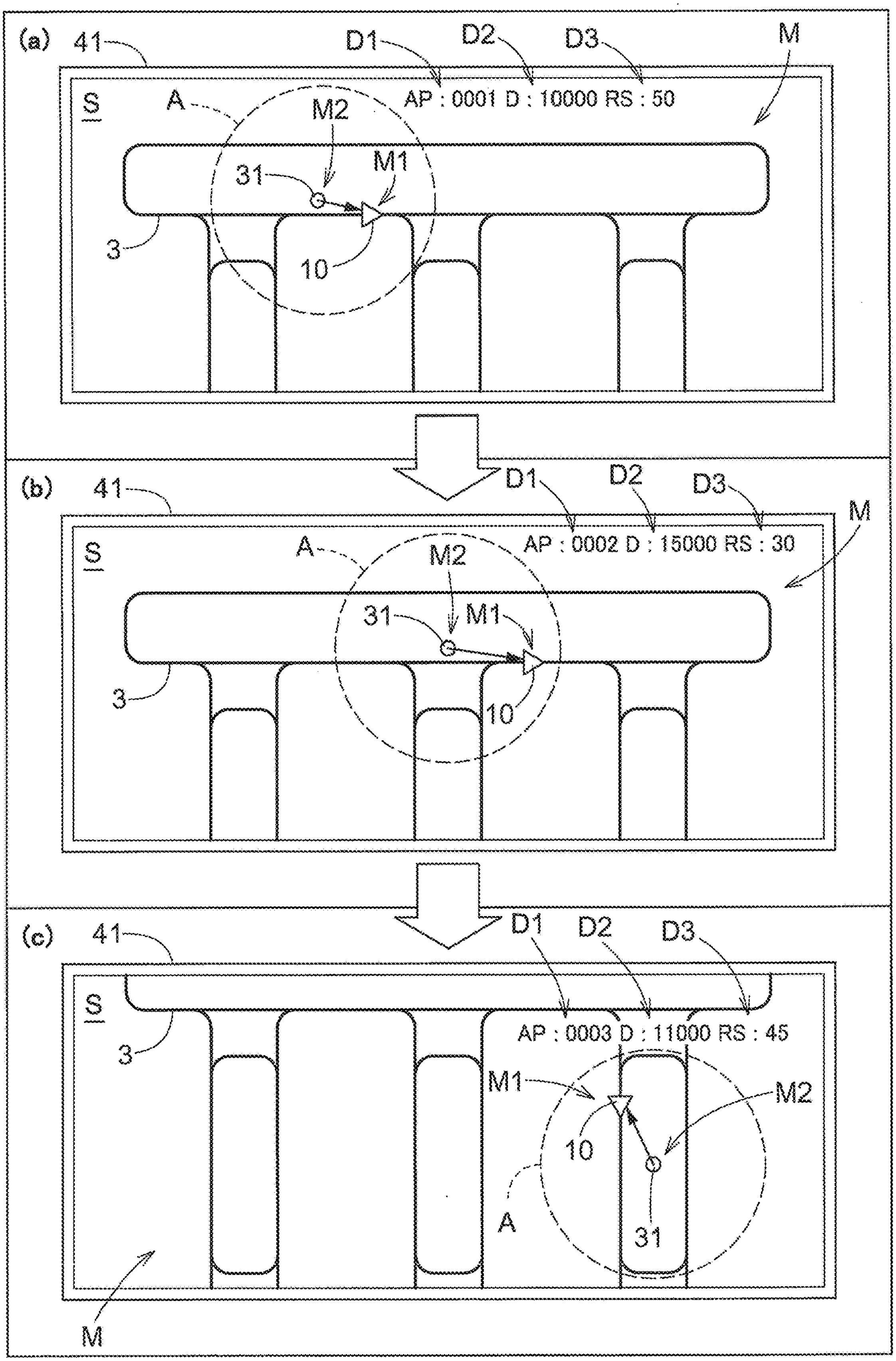
FIG. 5 is a diagram of example images displayed on a display through a display process.

The vehicle communicator 11 includes a communication module that performs wireless communication with the wireless transmitter-receivers 31. The communication module performs wireless communication in accordance with the communication standard (e.g., a wireless LAN) of the wireless transmitter-receivers 31. The vehicle communicator 11 functions as a wireless station that performs wireless communication with the wireless transmitter-receivers 31. The vehicle communicator 11 establishes a communication link with a selected wireless transmitter-receiver 31 (e.g., a wireless transmitter-receiver 31 with the strongest radio wave intensity), thus being connected to the selected wireless transmitter-receiver 31 to allow communication. As shown in FIG. 5 referred to later, as the transport vehicle 10 travels, the vehicle communicator 11 in the transport vehicle 10 switches (roams) the wireless transmitter-receiver 31 to establish a communication link. For example, roaming is performed when the reception strength of the radio wave from the connected wireless transmitter-receiver 31 lowers less than or equal to the predetermined value. In this manner, the transport vehicle 10 travels while switching between the wireless transmitter-receivers 31 as the connection destination.

The transport control device 20 tracks the current positions of the transport vehicles 10. In the present embodiment, each transport vehicle 10 identifies its current position, and the transport control device 20 obtains information about the current position of the transport vehicle 10 from the transport vehicle 10. The transport control device 20 obtains information about the current positions of the transport vehicles 10 from each transport vehicle 10, thus tracking the current position of each of the multiple transport vehicles 10.

Each transport vehicle 10 identifies its current position, for example, in the manner described below. Information storages such as 2D codes or RF tags are at multiple positions on the travel path 3. Each information storage stores position information about the position of the information storage. Each transport vehicle 10 includes a reader that reads the position information stored in the information storages and a travel distance detector (e.g., a rotary encoder) that detects the travel distance of the transport vehicle 10. Each transport vehicle 10 identifies its current position based on the position information read by the reader and the travel distance obtained after the reader reads the position information. The transport vehicle 10 may identify its current position based on an output from a positioning device such as a global navigation satellite system (GNSS) receiver.

The transport control device 20 assigns a task for transporting a transport article 2 to any of the transport vehicles 10. The task is generated, for example, based on a transport schedule for the transport article 2 or in response to a transport request for the transport article 2. The task is generated by the transport control device 20 or by another device (e.g., a higher-level controller) that can communicate with the transport control device 20. The transport control device 20 transmits a task execution command to the transport vehicle 10 with the assigned task.

The task is, for example, a transport task for transporting the transport article 2 from a sender to a destination, or a dispatching task for placing the transport vehicle 10 at a specified position (e.g., a position scheduled or predicted as the sender of the transport article 2). Examples of the sender and the destination include a loading port in the processing device 5, a loading and unloading port in a storage device (not shown) that stores transport articles 2, and a storage shelf (not shown) that temporarily stores the transport articles 2. The transport vehicle 10 with a transport task assigned travels to the sender specified with the transport task, receives a transport article 2, and then travels to the destination specified with the transport task to deliver the transport article 2. The transport vehicle 10 with a dispatching task assigned travels to a position specified with the dispatching task and waits at the position.

The monitoring system 40 monitors the status of the communication system 30. The monitoring system 40 includes a computer such as a personal computer or a workstation. The monitoring system 40 may be a set of multiple pieces of hardware (multiple separate pieces of hardware) that can communicate with one another in a wired or wireless manner, rather than a single piece of hardware.

The monitoring system 40 can obtain information (more specifically, map data 51, transmitter-receiver position data 52, travel data 53, connection data 54, radio wave data 55, and connected transport vehicle data 56, which will be described later) stored in the storage 21 and the log storage 32. The information obtained by the monitoring system 40 with reference to the storage 21 and the log storage 32 is stored in, for example, a storage (e.g., a flash memory or a hard disk drive; not shown) in the monitoring system 40. The information stored in the storage is, for example, deleted after a predetermined period of time. FIG. 4 shows an example of the monitoring system 40 that refers to the storage 21 in the transport control device 20 and the log storage 32 in the wireless transmitter-receiver 31 through the communication network N.

As shown in FIG. 4, the monitoring system 40 includes a display 41 that displays information and a controller 42. The display 41 is, for example, a monitor (display unit) of a computer as the monitoring system 40. The controller 42 incudes, for example, an arithmetic processor such as a CPU and a peripheral circuit such as a memory. The functions of the controller 42 are implemented by, for example, hardware such as an arithmetic processor and a program executable on the hardware operating in cooperation with each other.

The controller 42 controls the display 41. The controller 42 generates a display image to be displayed on a display screen S (refer to FIGS. 5 to 9) of the display 41 and controls the display 41 to display the display image on the display screen S. Examples of the display 41 include a liquid crystal display and an organic electroluminescent (EL) display. In FIGS. 5 to 9, the display screen S is disposed on the outer surface of the display 41. The display screen S may be projected onto, for example, a projection surface.

The controller 42 obtains operation information describing the details of operations (e.g., a screen operation) performed by an operator or others on an input device (not shown), and generates a display image based on the details of the operation information. Examples of the input device include a keyboard and a pointing device (e.g., a mouse, a touchpad, or a touchscreen). The display 41 may be integral with the input device, or for example, may be a device with the display screen S functioning as a touchscreen.

As shown in FIG. 4, the monitoring system 40 includes a travel data obtainer 43 and a connection data obtainer 44. In the present embodiment, the monitoring system 40 further includes a radio wave data obtainer 45 and a connected transport vehicle data obtainer 46. These functional components (43 to 46) in the monitoring system 40 are implemented by the controller 42 (more specifically, the arithmetic processor) executing a program. The functional components in the monitoring system 40 are at least logically distinguishable from one another, and may not be physically separate from one another.

In FIGS. 3 and 4, the monitoring system 40 is separate from the transport control device 20. The monitoring system 40 may include the transport control device 20, for example, using a common computer to implement the transport control device 20 and the monitoring system 40. For example, a controller (not shown) in the transport control device 20 may be used as the controller 42 in the monitoring system 40, a monitor (not shown) in the transport control device 20 may be used as the display 41 in the monitoring system 40, and the storage 21 in the transport control device 20 may be used as a storage (not shown) in the monitoring system 40.

Thus, the transport control device 20 may be at least partially included in the monitoring system 40. In this case, at least one of the functional components (43 to 46) in the monitoring system 40 may be implemented by the transport control device 20. Similarly, the wireless transmitter-receiver 31 may be at least partially included in the monitoring system 40. In this case, at least one of the functional components (43 to 46) in the monitoring system 40 may be implemented by the wireless transmitter-receiver 31.

The travel data obtainer 43 is a functional component that obtains the travel data 53. The travel data 53 includes position information indicating the position of the transport vehicle 10 and time information indicating time in a manner associated with each other. The time information associated with the position information indicating the position of the transport vehicle 10 indicates the time when the transport vehicle 10 is at the position. In other words, the travel data 53 is data (travel log data) recorded by associating the history of the positions of the transport vehicle 10 with the time. The travel data obtainer 43 obtains travel data 53 at, for example, predetermined intervals. In the present embodiment, the transport facility 1 includes the multiple transport vehicles 10, and the travel data 53 is associated with the transport vehicle specifying information (identification information about the transport vehicles 10) specifying the transport vehicles 10. In other words, the travel data 53 includes the transport vehicle specifying information, the position information about the transport vehicle 10, and the time information in a manner associated with one another.

In the present embodiment, the transport vehicle 10 transmits its position information (current position information) to the transport control device 20 sequentially or periodically. When obtaining the position information from the transport vehicle 10, the transport control device 20 stores the position information about the transport vehicle 10 into the storage 21 in a manner associated with the time information indicating the time of obtainment of the position information (also in a manner associated with the transport vehicle specifying information about the transport vehicle 10 in the present embodiment). The travel data obtainer 43 obtains the travel data 53 with reference to the storage 21. Unlike such a structure, the transport vehicle 10 may transmit its position information as the travel data 53 in a manner associated with the time information indicating the time of identification of the position information, and the transport control device 20 may store the travel data 53 obtained from the transport vehicle 10 into the storage 21 (the travel data 53 is stored in a manner associated with the transport vehicle specifying information about the transport vehicle 10 in the present embodiment). The data transmitted from the transport vehicle 10 to the transport control device 20 may include the transport vehicle specifying information about the transport vehicle 10.

The connection data obtainer 44 is a functional component that obtains the connection data 54. The connection data 54 includes the connection destination information and the time information in a manner associated with each other. The connection destination information indicates the relationship between the vehicle communicator 11 and a destination wireless transmitter-receiver 31 to which the vehicle communicator 11 is connected. The destination wireless transmitter-receiver 31 is included in the multiple wireless transmitter-receivers 31. In other words, the connection destination information includes transmitter-receiver specifying information (identification information about the wireless transmitter-receiver 31) that identifies the destination wireless transmitter-receiver 31 to which the vehicle communicator 11 is connected. The time information associated with the connection destination information indicates the time when the vehicle communicator 11 is connected to (in other words, logged in) the destination wireless transmitter-receiver 31 included in the connection destination information. The time information associated with the connection destination information may further indicate the time when the connection between the vehicle communicator 11 and the destination wireless transmitter-receiver 31 is disconnected (in other words, logged out). The connection data obtainer 44 obtains the connection data 54 at, for example, predetermined intervals. In the present embodiment, the transport facility 1 includes the multiple transport vehicles 10, and the connection data 54 is associated with the transport vehicle specifying information. In other words, the connection data 54 includes the transport vehicle specifying information, the connection destination information, and the time information in a manner associated with one another.

In the present embodiment, when the transport vehicle 10 is connected to the wireless transmitter-receiver 31, the wireless transmitter-receiver 31 stores, into the log storage 32, time information indicating the time of the connection in a manner associated with the transport vehicle specifying information about the transport vehicle 10 (or in a manner associated with the transport vehicle specifying information about the transport vehicle 10 and the transmitter-receiver specifying information about the wireless transmitter-receiver 31). The connection data obtainer 44 obtains the connection data 54 with reference to the log storage 32. When the data stored in the log storage 32 is not associated with the transmitter-receiver specifying information about the wireless transmitter-receiver 31 including the log storage 32, the connection data obtainer 44 obtains the connection data 54 by associating the data obtained from the log storage 32 with the transmitter-receiver specifying information about the wireless transmitter-receiver 31 including the log storage 32.

The transport vehicle 10 may have the structure described below when the transport vehicle 10 can identify the destination wireless transmitter-receiver 31 to which the vehicle communicator 11 in the transport vehicle 10 is connected. When the vehicle communicator 11 in the transport vehicle 10 is connected to the wireless transmitter-receiver 31, the transport vehicle 10 transmits the time information indicating the time of the connection to the transport control device 20 in a manner associated with the transmitter-receiver specifying information about the destination wireless transmitter-receiver 31. The transport control device 20 stores the connection data 54 obtained from the transport vehicle 10 into the storage 21 in a manner associated with the transport vehicle specifying information about the transport vehicle 10. The connection data obtainer 44 obtains the connection data 54 with reference to the storage 21.

The radio wave data obtainer 45 is a functional component that obtains the radio wave data 55. The radio wave data 55 includes radio wave intensity information during connection and the time information in a manner associated with each other. The radio wave intensity information during connection indicates the intensity of the communication radio wave (radio wave intensity) during connection between each of the multiple wireless transmitter-receivers 31 and the vehicle communicator 11. The time information associated with the radio wave intensity information during connection indicates the time of detection of the radio wave intensity indicated by the radio wave intensity information during connection. The radio wave intensity is represented by, for example, a numerical value of a received signal strength indicator (RSSI). The radio wave data obtainer 45 obtains the radio wave data 55 at, for example, predetermined intervals.

In the present embodiment, the transport facility 1 includes the multiple transport vehicles 10. The radio wave data 55 includes the radio wave intensity information during connection and the time information in a manner associated with each other. The radio wave intensity information during connection indicates the intensity of the communication radio wave during connection between each of the multiple wireless transmitter-receivers 31 and the vehicle communicator 11 in each of the multiple transport vehicles 10. More specifically, the radio wave data 55 is associated with the transport vehicle specifying information specifying the transport vehicles 10. In other words, the radio wave data 55 includes the transport vehicle specifying information, the radio wave intensity information during connection, and the time information in a manner associated with one another. Although the radio wave data 55 may be associated with the transmitter-receiver specifying information about the destination wireless transmitter-receiver 31 to which the vehicle communicator 11 is connected, the radio wave data 55 may not be associated with the transmitter-receiver specifying information about the wireless transmitter-receiver 31. The wireless transmitter-receiver 31 to which the vehicle communicator 11 is connected at the time of detection of the radio wave intensity indicated by the radio wave intensity information during connection can be tracked using the connection data 54.

In the present embodiment, the radio wave intensity indicated by the radio wave intensity information during connection is the radio wave intensity of the vehicle communicator 11 (reception intensity of the radio wave transmitted from the vehicle communicator 11) detected by the wireless transmitter-receiver 31. The wireless transmitter-receiver 31 periodically detects, for example, the radio wave intensity of the vehicle communicator 11 during connection with the wireless transmitter-receiver 31, and stores the detected radio wave intensity information (specifically, radio wave intensity information during connection) into the log storage 32 in a manner associated with the time information indicating the time of detection (also in a manner associated with the transport vehicle specifying information about the transport vehicle 10 including the vehicle communicator 11 in the present embodiment). The radio wave data obtainer 45 obtains the radio wave data 55 with reference to the log storage 32.

The connected transport vehicle data obtainer 46 is a functional component that obtains the connected transport vehicle data 56. The connected transport vehicle data 56 includes the transport vehicle specifying information and the time information in a manner associated with each other. The transport vehicle specifying information specifies the transport vehicle 10 connected to each of the multiple wireless transmitter-receiver 31. The time information associated with the transport vehicle specifying information indicates the time of identification of the transport vehicle 10 connected to each of the multiple wireless transmitter-receivers 31. The connected transport vehicle data obtainer 46 obtains the connected transport vehicle data 56 at, for example, predetermined intervals.

In the present embodiment, the connected transport vehicle data obtainer 46 obtains the connected transport vehicle data 56 with reference to the log storage 32. The connected transport vehicle data 56 can be generated from the connection data 54 about each of the multiple transport vehicles 10. The connected transport vehicle data obtainer 46 may obtain the connection data 54 from the log storage 32 in each of the multiple wireless transmitter-receivers 31 and generate the connected transport vehicle data 56. Integrated data including the connection data 54 and the connected transport vehicle data 56 may be stored into the log storage 32.

In the present embodiment, the monitoring system 40 (more specifically, the controller 42) can refer to the map data 51 indicating a map M of the travel path 3 of the transport vehicle 10. In the present embodiment, the map data 51 includes arrangement information about the multiple wireless transmitter-receivers 31, in addition to information about the map M of the travel path 3. In the present embodiment, the map data 51 includes the transmitter-receiver position data 52 indicating the respective positions of the multiple wireless transmitter-receivers 31. The monitoring system 40 (more specifically, the controller 42) can refer to the transmitter-receiver position data 52. In the example shown in FIG. 4, the map data 51 and the transmitter-receiver position data 52 are stored in the storage 21. The map data 51 and the transmitter-receiver position data 52 may be stored into another storage that can be referred to by the monitoring system 40.

The structure of the controller 42 in the monitoring system 40 will now be described. The controller 42 performs a display process that causes the display 41 to display the connection information based on the travel data 53 and the connection data 54. The connection information indicates the relationship between the position of the transport vehicle 10 and a destination wireless transmitter-receiver 31 to which the transport vehicle 10 is connected at the position. Being connected at the position includes both a communication link being established (in other words, logged in) at the position and a communication link being established before the transport vehicle reaches the position. The controller 42 can obtain information from the travel data 53 about the position at which the transport vehicle 10 is located at each point in time, and obtain information from the connection data 54 about the wireless transmitter-receiver 31 to which the vehicle communicator 11 is connected at each point in time. The controller 42 can thus link the travel data 53 and the connection data 54 based on time to generate the connection information about the position at which the transport vehicle 10 is connected and about the wireless transmitter-receiver 31 to which the transport vehicle 10 is connected.

FIGS. 5 and 6 show the state of the connection information being displayed on the display screen S through the display process. In the example shown in FIG. 5, one or more specific transport vehicles 10 (one specific transport vehicle 10 in this example) are targets of the display process, and the connection information indicating a destination wireless transmitter-receiver 31 to which the specific transport vehicle 10 is connected is displayed on the display screen S. In contrast, in the example shown in FIG. 6, one or more specific wireless transmitter-receivers 31 (one specific wireless transmitter-receiver 31 in this example) are targets of the display process, and the connection information indicating the transport vehicles 10 connected to the specific wireless transmitter-receiver 31 are displayed on the display screen S. Although not displayed on the display screen S in the examples shown in FIGS. 5 and 6, information about the time when the transport vehicle 10 is located at the position indicated by the connection information may be displayed on the display screen S.

In the present embodiment, as shown in FIG. 5, the controller 42 causes, in the display process, the display 41 to display the map M based on the map data 51 and to display, on the map M, a transport vehicle mark M1 and a connection destination transmitter-receiver mark M2 as the connection information. The transport vehicle mark M1 indicates the position of the transport vehicle 10. The connection destination transmitter-receiver mark M2 indicates the destination wireless transmitter-receiver 31 to which the transport vehicle 10 is connected at the position. The layout of the travel path 3 defined by the rails 4 (refer to FIG. 2) is displayed as the map M in FIG. 5. The travel path 3 actually traveled by the transport vehicle 10 may be simply displayed as the map M.

The transport vehicle mark M1 is a triangular mark and the connection destination transmitter-receiver mark M2 is a circular mark in the example shown in FIG. 5. The shape or the form of the transport vehicle mark M1 and the connection destination transmitter-receiver mark M2 can be changed as appropriate. In this example, a circle indicating the communication area A of the destination wireless transmitter-receiver 31 is also displayed on the map M. In this example, a connection destination transmitter-receiver indication D1 indicating the destination wireless transmitter-receiver 31 is displayed on the display screen S. The connection destination transmitter-receiver indication D1 is an indication that combines a character indicating the wireless transmitter-receiver 31 (AP in this example) and a number indicating the identification information about the destination wireless transmitter-receiver 31 (e.g., 0001 in this example).

In the example shown in FIG. 5, the specific transport vehicle 10 is a target of the display process, and the connection information indicating the destination wireless transmitter-receiver 31 to which the specific transport vehicle 10 is connected is displayed on the display screen S as described above. In FIG. 5, the transport vehicle mark M1 indicates the position of the specific transport vehicle 10 (one transport vehicle 10 in this example), and the connection destination transmitter-receiver mark M2 indicates the destination wireless transmitter-receiver 31 to which the specific transport vehicle 10 is connected at the position. In this example, the area around the position of the specific transport vehicle 10 in the map M is displayed in an enlarged manner.

In FIG. 5, the images displayed on the display screen S are chronologically shown in the order of FIGS. 5(*a*), 5(*b*), and 5(*c*). At the positions shown in the figures, the specific transport vehicle 10 is connected to different wireless transmitter-receivers 31. For example, the controller 42 can move the transport vehicle mark M1 in response to a movement operation on the input device (not shown). In this case, the connection destination transmitter-receiver mark M2 is displayed to indicate, at the position to which the transport vehicle mark M1 is moved, a destination wireless transmitter-receiver 31 to which the transport vehicle 10 is connected.

In the example shown in FIG. 5, the display screen S simply displays the specific transport vehicle 10 (more specifically, the transport vehicle mark M1 indicating the transport vehicle 10) and the destination wireless transmitter-receiver 31 to which the specific transport vehicle 10 is connected (more specifically, the connection destination wireless transmitter-receiver mark M2 indicating the wireless transmitter-receiver 31). The display screen S thus indicates the connection information (correspondence between the transport vehicle 10 and the destination wireless transmitter-receiver 31 to which the transport vehicle 10 is connected). To indicate the connection information more clearly in this example, the correspondence between the transport vehicle 10 and the destination wireless transmitter-receiver 31 to which the transport vehicle 10 is connected is indicated by a graphical symbol connecting the transport vehicle 10 and the wireless transmitter-receiver 31 (the arrow from the wireless transmitter-receiver 31 to the transport vehicle 10 in this example). In some embodiments, for example, the correspondence between the transport vehicle 10 and the destination wireless transmitter-receiver 31 to which the transport vehicle 10 is connected can be indicated by illustrating the transport vehicle 10 and the wireless transmitter-receiver 31 with graphical symbols of the same color.

The controller 42 may perform a reproduction display process in the display process to visually clearly display the destination wireless transmitter-receiver 31 changing with movement of the transport vehicle 10. The reproduction display process causes the transport vehicle mark M1 to move on the map M and the connection destination transmitter-receiver mark M2 to change to correspond to the destination wireless transmitter-receiver 31 changing with movement of the transport vehicle mark M1. In the reproduction display process, the transport vehicle mark M1 is moved along the travel path 3 traveled by the transport vehicle 10, which is indicated by the transport vehicle mark M1 on the map M. In response to, for example, a reproduction display operation performed on the input device (not shown) such as a click operation on a button image representing a reproduction display, the controller 42 performs the reproduction display process. The controller 42 may perform the reproduction display process not under the condition of receiving the reproduction display operation (e.g., automatically).

For example, when the controller 42 starts the reproduction display process with the image shown in FIG. 5(*a*) displayed on the display screen S, the image shown in FIG. 5(*b*) and the image shown in FIG. 5(*c*) are displayed on the display screen S sequentially. In the example shown in FIG. 5, the wireless transmitter-receiver 31 to which the transport vehicle 10 is connected alone is indicated by the connection destination transmitter-receiver mark M2. The connection destination transmitter-receiver mark M2 (more specifically, the position of the connection destination transmitter-receiver mark M2, or in other words, the wireless transmitter-receiver 31 indicated by the connection destination transmitter-receiver mark M2) thus changes to correspond to the change of the destination wireless transmitter-receiver 31 with the movement of the transport vehicle mark M1.

The speed at which the transport vehicle mark M1 moves on the map M in the reproduction display process can be set to a speed corresponding to the travel speed at each position of the transport vehicle 10 based on the travel data 53. In this case, for example, the travel data 53 includes speed information indicating the travel speed of the transport vehicle 10 and time information in a manner associated with each other, and the controller 42 obtains the travel speed at each position of the transport vehicle 10 based on the travel data 53. The speed information about the transport vehicle 10 may not be included in the travel data 53. The controller 42 may obtain the travel speed of the transport vehicle 10 by calculation based on the position and the time information about the transport vehicle 10 included in the travel data 53. The speed at which the transport vehicle mark M1 moves on the map M in the reproduction display process may be set to a constant speed independent of the travel speed of the transport vehicle 10.

In the example shown in FIG. 5, a distance indication D2 is displayed on the display screen S. When the controller 42 causes the display 41 to display the connection distance information in addition to the connection information in the display process, the distance indication D2 indicating the connection distance information is displayed on the display screen S. The connection distance information indicates a distance (hereafter referred to as a connection distance) between the position of the transport vehicle 10 and the destination wireless transmitter-receiver 31 to which the transport vehicle 10 is connected at the position. The controller 42 causes the display 41 to display the connection distance information based on the travel data 53 and the transmitter-receiver position data 52 (and further on the connection data 54 as appropriate). In this example, the distance indication D2 is an indication that combines a character indicating the connection distance (D in this example) and a number indicating the connection distance scale (e.g., 10000 in this example). The distance indication D2 may be, for example, a schematic graphical symbol that indicates the connection distance scale.

In the example shown in FIG. 5, a radio wave intensity indication D3 is displayed on the display screen S. When the controller 42 causes the display 41 to display the radio wave intensity information in addition to the connection information in the display process, the radio wave intensity indication D3 indicating the radio wave intensity information is displayed on the display screen S. The radio wave intensity information indicates the relationship between the position of the transport vehicle 10 and the intensity of the communication radio wave between the transport vehicle 10 at the position and the destination wireless transmitter-receiver 31 (the radio wave intensity of the vehicle communicator 11 detected by the destination wireless transmitter-receiver 31 in the present embodiment). The controller 42 causes the display 41 to display the radio wave intensity information based on the travel data 53 and the radio wave data 55 (and further on the connection data 54 as appropriate). In this example, the radio wave intensity information is displayed with the transport vehicle mark M1 indicating the position of the transport vehicle 10 and the radio wave intensity indication D3 indicating the intensity of the communication radio wave between the transport vehicle 10 and the destination wireless transmitter-receiver 31.

The controller 42 can obtain information, from the travel data 53, about the position at which the transport vehicle 10 is located at each point in time, and obtain information, from the radio wave data 55, about the level of intensity of the communication radio wave between the vehicle communicator 11 and the destination wireless transmitter-receiver 31 to which the vehicle communicator 11 is connected at each point in time. The controller 42 can thus link the travel data 53 and the radio wave data 55 based on time to generate the radio wave intensity information about the position and the level of the radio wave intensity of the transport vehicle 10. In the example shown in FIG. 5, the radio wave intensity indication D3 is an indication that combines a character indicating a radio wave intensity (RS in this example) and a number indicating the radio wave intensity (e.g., 50 in this example). The radio wave intensity indication D3 may be, for example, a schematic graphical symbol that indicates the level of the radio wave intensity.

The example shown in FIG. 6 will now be described. In the example shown in FIG. 6, the specific wireless transmitter-receiver 31 is a target of the display process, and the connection information indicating the transport vehicle 10 connected to the specific wireless transmitter-receiver 31 is displayed on the display screen S as described above. In FIG. 6, a mark (a circular mark in this example, similarly to the connection destination transmitter-receiver mark M2 shown in FIG. 5) indicates the position of the specific wireless transmitter-receiver 31 (one wireless transmitter-receiver 31 in this example), and a mark (a triangular mark in this example, similarly to the transport vehicle 10 shown in FIG. 5) indicates the position of the transport vehicle 10. Although not displayed on the display screen S in the example shown in FIG. 6, an indication of the specific wireless transmitter-receiver 31 (e.g., an indication similar to the connection destination transmitter-receiver indication D1 shown in FIG. 5) may be displayed on the display screen S. The example shown in FIG. 6 will be described focusing on the differences from the example shown in FIG. 5, and the feature common to the example shown in FIG. 5 will not be described.

In the example shown in FIG. 6, all the transport vehicles 10 in the area of the map M displayed on the display screen S (an enlarged area around one specific wireless transmitter-receiver 31 in this example) are shown. In this example, the transport vehicles 10 connected to the specific wireless transmitter-receiver 31 (hereafter referred to as connected transport vehicles 10*a*) are displayed in a manner different from the manner in which the other transport vehicles 10 are displayed to indicate the connection information (correspondence between the transport vehicles 10 and the destination wireless transmitter-receiver 31 to which the transport vehicle 10 are connected). In this example, the connected transport vehicles 10*a* are indicated by solid triangular marks, and the other transport vehicles 10 are indicated by outlined triangular marks, thus highlighting the connected transport vehicles 10*a*. In addition to different types of graphical symbol, the graphical symbol for the connected transport vehicles 10*a* may be displayed in a different manner (e.g., with more emphasis than the other transport vehicles 10) using a different size or color (e.g., a color tone and brightness), with a different thickness or type of line segments of the graphical symbol, or with a combination of these.

In FIG. 6, the images displayed on the display screen S are chronologically shown in the order of FIGS. 6(*a*), 6(*b*), and 6(*c*). In the example shown in FIG. 6, the display screen S shows a connected vehicle number indication D4, indicating the number of transport vehicles 10 (the number of connected transport vehicles 10*a*) connected to the specific wireless transmitter-receiver 31 at each point in time (the number of logged-in vehicles). In this example, the connected vehicle number indication D4 is an indication that combines a character indicating the number of transport vehicles 10 (NOV as an acronym for number of vehicles in this example) and a number indicating the number of transport vehicles 10 (e.g., 5 in this example). The connected vehicle number indication D4 may be, for example, a schematic graphical symbol that displays the number of transport vehicles 10.

The controller 42 may perform a reproduction display process in the display process to visually clearly display changes in the number of logged-in vehicles over time. In the reproduction display process, the mark indicating the transport vehicle 10 is moved on the map M and the mark indicating the transport vehicle 10 is changed in response to changes in the status of connection with the specific wireless transmitter-receiver 31 that changes accordingly. For example, when the controller 42 starts the reproduction display process with the image shown in FIG. 6(*a*) displayed on the display screen S, the image shown in FIG. 6(*b*) and the image shown in FIG. 6(*c*) are displayed on the display screen S sequentially. In the example shown in FIG. 6, the connected transport vehicles 10*a* and the vehicles 10 other than the connected transport vehicles 10*a* are indicated with marks in different manners. The marks indicating the transport vehicles 10 are changed based on the changes in the status of connection with the specific wireless transmitter-receiver 31.

As described above, the controller 42 performs a display process that causes the display 41 to display at least the connection information. Although not limited to such a structure, in addition to the display process, the controller 42 may perform at least one of a first graph display process, a second graph display process, a faulty transmitter-receiver display process, or a radio wave intensity trend display process.

The first graph display process causes the display 41 to display a graph (hereafter referred to as a first graph G1) indicating the number of transport vehicles 10 connected to each of the multiple wireless transmitter-receivers 31 within a set period. The controller 42 performs the first graph display process based on the connected transport vehicle data 56. The controller 42 obtains information from the connected transport vehicle data 56 about each transport vehicle 10 connected and the wireless transmitter-receiver 31 to which the transport vehicle 10 is connected at each point in time to generate the first graph G1 (refer to FIG. 7). The number of transport vehicles 10 (the number of logged-in vehicles) shown in the first graph G1 is, for example, the maximum number of transport vehicles 10 connected to each of the multiple wireless transmitter-receivers 31 within a set period (specifically, the maximum number of simultaneously connected transport vehicles 10). In some embodiments, the number of transport vehicles 10 (the number of logged-in vehicles) shown in the first graph G1 may be the cumulative number of transport vehicles 10 connected to each of the multiple wireless transmitter-receivers 31 within a set period.

The second graph display process causes the display 41 to display a graph (hereafter referred to as a second graph G2) indicating the radio wave intensity indicated by the radio wave intensity information during connection within a set period for each of the multiple wireless transmitter-receivers 31. The controller 42 performs the second graph display process based on the radio wave data 55. As described above, the radio wave intensity information during connection indicates the intensity of the communication radio wave (radio wave intensity) during connection between each of the multiple wireless transmitter-receivers 31 and the vehicle communicator 11 in each of the multiple transport vehicles 10. The controller 42 obtains information from the radio wave intensity information during connection included in the radio wave data 55 about the radio wave intensity at each point in time for each of the multiple wireless transmitter-receivers 31 to generate the second graph G2 (refer to FIG. 7). The radio wave intensity shown in the second graph G2 is, for example, an average value (time average value; the same applies hereafter) of the radio wave intensities within the set period for each of the multiple wireless transmitter-receivers 31. This average value is, for example, obtained by averaging the radio wave intensities without distinguishing the multiple transport vehicles 10.

The display process for displaying the connection information and the first graph display process may be switched or performed simultaneously. When the display process for displaying the connection information and the first graph display process are performed simultaneously, the image showing the connection information and the first graph G1 are displayed simultaneously (e.g., in different areas in the display screen S). The display process for displaying the connection information and the second graph display process may be switched or performed simultaneously. When the display process for displaying the connection information and the second graph display process are performed simultaneously, the image showing the connection information and the second graph G2 are displayed simultaneously (e.g., in different areas in the display screen S).

Figure 7:
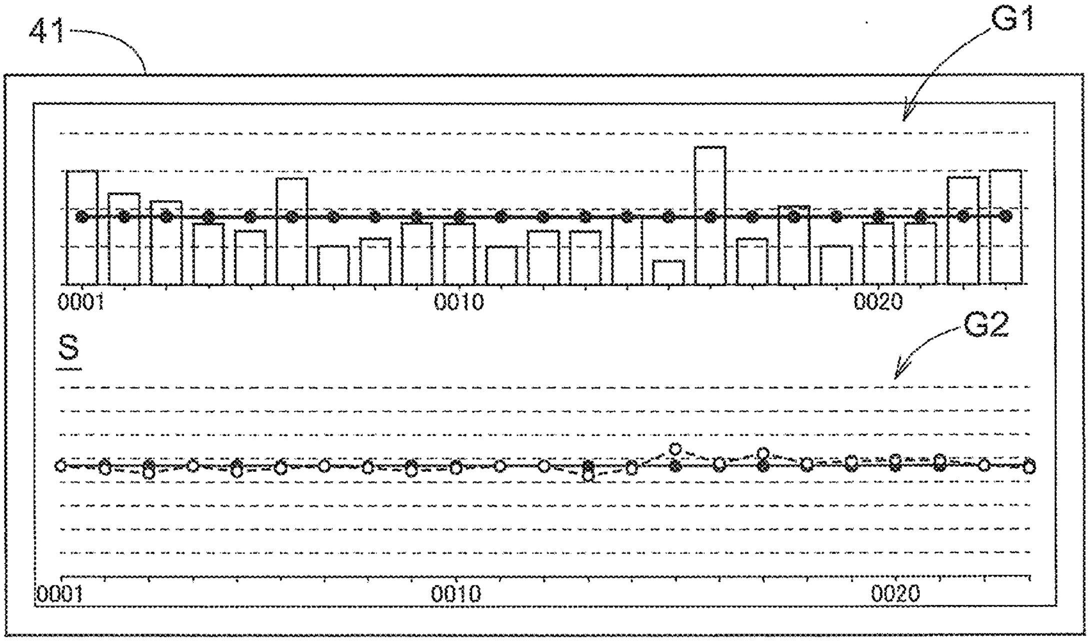
FIG. 7 is a diagram of an example image displayed on the display through a graph display process.

The first graph display process and the second graph display process may be switched or performed simultaneously. FIG. 7 shows an example in which the first graph display process and the second graph display process are performed simultaneously, and the first graph G1 and the second graph G2 are displayed in different areas in the display screen S. In both the first graph G1 and the second graph G2 in this example, the horizontal axis indicates the multiple wireless transmitter-receivers 31. The numbers such as 0001 indicate the identification numbers of the wireless transmitter-receivers 31. In the first graph G1, the number of logged-in vehicles within a set period for each of the wireless transmitter-receivers 31 is shown as a bar graph, and the average number of logged-in vehicles is shown as a line graph. The second graph G2 shows, in a superimposed manner, a line graph indicating the average value of the radio wave intensities within a set period for each of the wireless transmitter-receivers 31 and a line graph indicating an average value of the average values.

The faulty transmitter-receiver display process causes the display 41 to display a faulty transmitter-receiver 31*a*. The controller 42 performs the faulty transmitter-receiver display process by using, as a faulty transmitter-receiver 31*a*, a wireless transmitter-receiver 31 with at least one of the number of transport vehicles 10 connected within a set period or the radio wave intensity indicated by the radio wave intensity information during connection within the set period being less than a predetermined determination threshold value. The controller 42 may use, as a faulty transmitter-receiver 31*a*, a wireless transmitter-receiver 31 not allowing continuous (in other words, more than or equal to a set number of times of) data obtainment from the log storage 32.

For example, the faulty transmitter-receiver display process can display the faulty transmitter-receiver 31*a* (e.g., highlight the faulty transmitter-receiver 31*a* over the other wireless transmitter-receivers 31) on the first graph G1 and the second graph G2 described above. The faulty transmitter-receiver display process can also display an image on the display screen S as shown in FIG. 8.

Figure 8:
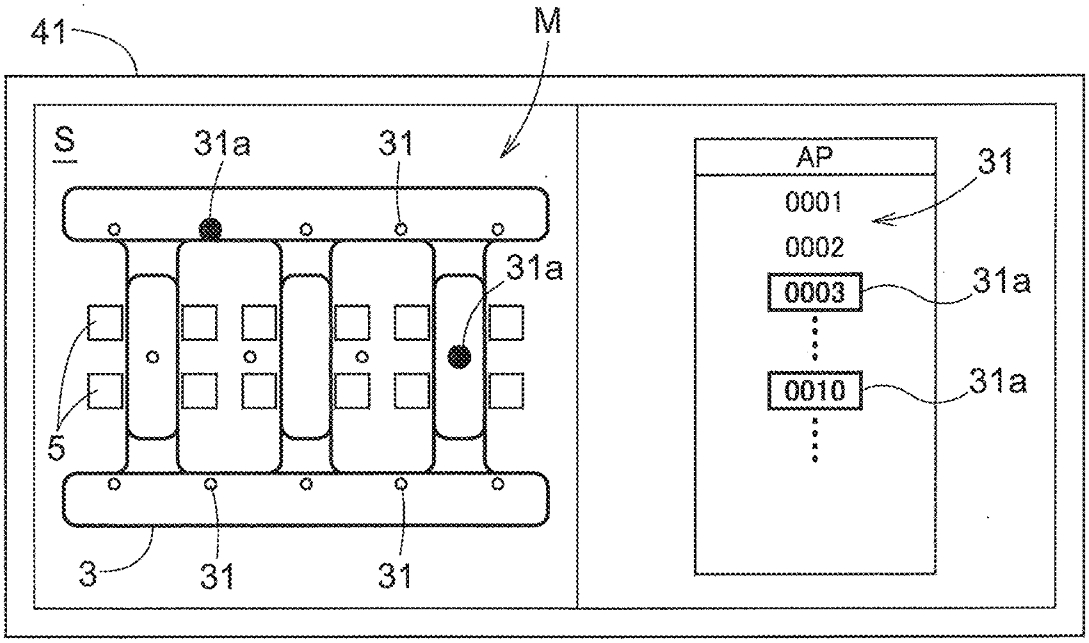
FIG. 8 is a diagram of an example image displayed on the display through a faulty transmitter-receiver display process.

In the example shown in FIG. 8, the display screen S has a left area showing a map of faulty transmitter-receivers 31*a* on the map M, and a right area showing a list of faulty transmitter-receivers 31*a*. The faulty transmitter-receiver map shows one or more faulty transmitter-receivers 31*a* (two faulty transmitter-receivers 31*a* in this example) and one or more wireless transmitter-receivers 31 that are not faulty transmitter-receivers 31*a* on the map M in a different manner. The faulty transmitter-receivers 31*a* are highlighted, with the faulty transmitter-receivers 31*a* shown as solid, large-diameter circular marks and the other wireless transmitter-receivers 31 as outlined, small-diameter circular marks. In the faulty transmitter-receiver list, the identification information about each of the multiple wireless transmitter-receivers 31 (in this example, referred to as AP) is displayed in a line, and the faulty transmitter-receivers 31*a* and the wireless transmitter-receivers 31 that are not the faulty transmitter-receivers 31*a* are displayed in a different manner. In this example, the identification information about each faulty transmitter-receiver 31*a* is framed to highlight the faulty transmitter-receiver 31*a*.

The radio wave intensity trend display process causes the display 41 to display a graph (hereafter referred to as a third graph G3) indicating the trend of the radio wave intensity indicated by the radio wave intensity information during connection for one or more specific wireless transmitter-receivers 31 (one specific wireless transmitter-receiver 31 in this example). The controller 42 performs the radio wave intensity trend display process based on the radio wave data 55.

Figure 9:
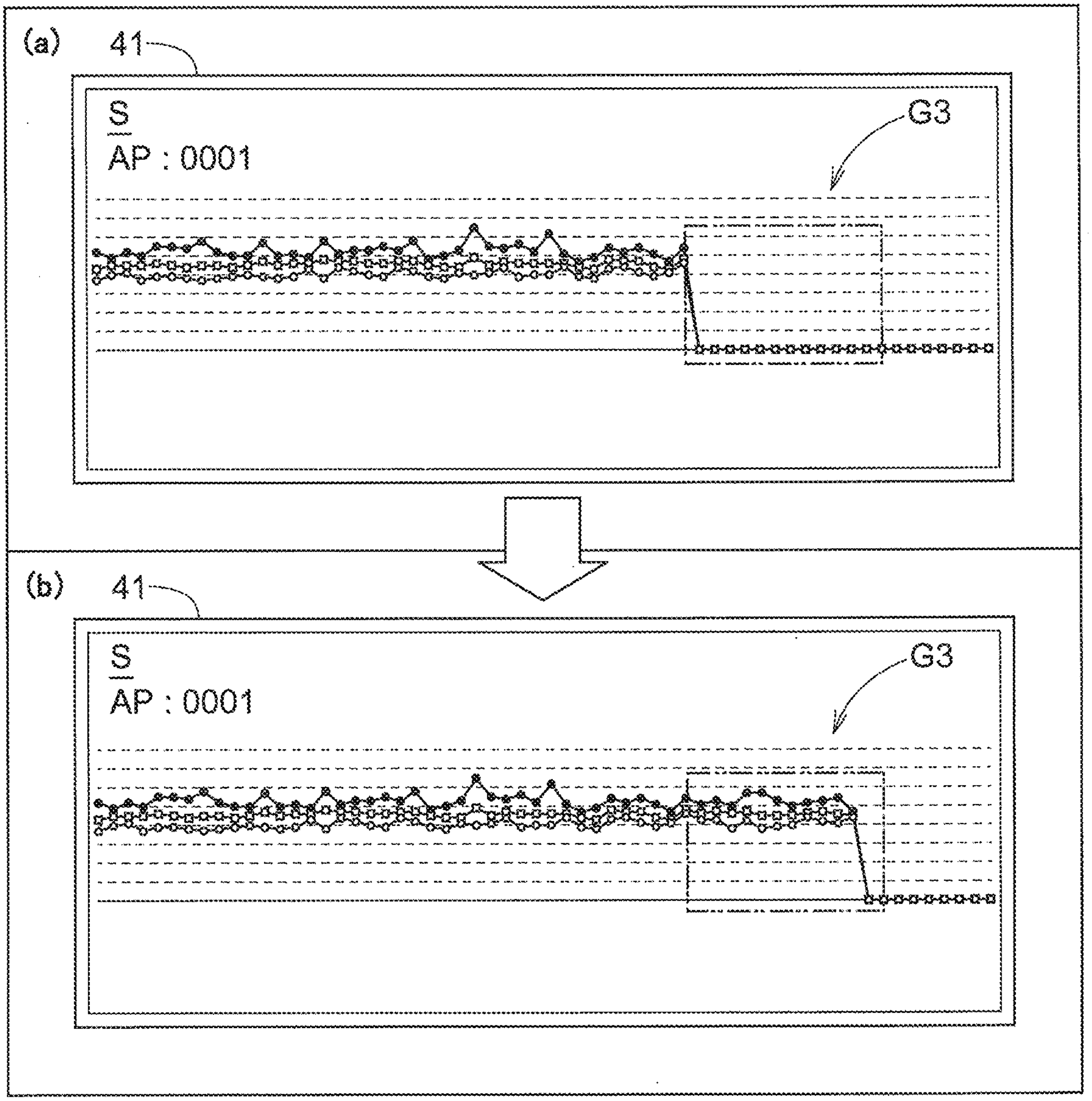
FIG. 9 is a diagram of example images displayed on the display through a radio wave intensity trend display process.

In the example shown in FIG. 9, the third graph G3 is shown for the wireless transmitter-receiver 31 with the identification number 0001, with the horizontal axis indicating time. The third graph G3 shows, in a superimposed manner, a line graph indicating the trend of the average value of the radio wave intensity within a set period (e.g., the radio wave intensity displayed in the second graph G2 described above), a line graph indicating the trend of the maximum value of the radio wave intensity within the set period, and a line graph indicating the trend of the minimum value of the radio wave intensity within the set period. The controller 42 updates the display of the third graph G3 at predetermined intervals. FIG. 9 shows the update of the third graph G3 as shown in FIG. 9(*b*) based on newly obtained radio wave data 55 after a predetermined time from the time point shown in FIG. 9(*a*). More specifically, the graph in the areas surrounded by two-dot-dash lines in FIGS. 9(*a*) and 9(*b*) is generated based on the newly obtained radio wave data 55.

OTHER EMBODIMENTS (1) In the above embodiment, the controller 42 causes, in the display process, the display 41 to display the map M based on the map data 51 and to display, on the map M, the transport vehicle mark M1 and the connection destination transmitter-receiver mark M2 as the connection information. The transport vehicle mark M1 indicates the position of a transport vehicle 10. The connection destination transmitter-receiver mark M2 indicating a destination wireless transmitter-receiver 31 to which the transport vehicle 10 is connected at the position. The disclosure is not limited to such a structure. For example, the controller 42 may cause, in the display process, the display 41 to display, as the connection information, a table showing the relationship between the position of the transport vehicle 10 and the destination wireless transmitter-receiver 31 to which the transport vehicle 10 is connected at the position.

(2) In the above embodiment, the radio wave intensity indicated by the radio wave intensity information during connection is the radio wave intensity of the vehicle communicator 11 detected by the wireless transmitter-receiver 31. The disclosure is not limited to such a structure. The radio wave intensity indicated by the radio wave intensity information during connection may be the radio wave intensity of the wireless transmitter-receiver 31 (reception intensity of the radio wave from the wireless transmitter-receiver 31) detected by the vehicle communicator 11. In this case, an example structure below may be used. For example, the transport vehicle 10 periodically detects the radio wave intensity of the destination wireless transmitter-receiver 31, and transmits the detected radio wave intensity information (specifically, the radio wave intensity information during connection) to the transport control device 20 in a manner associated with the time information indicating the time of the detection. The transport control device 20 stores the radio wave data 55 obtained from the transport vehicle 10 into the storage 21 in a manner associated with the transport vehicle specifying information about the transport vehicle 10. The radio wave data obtainer 45 obtains the radio wave data 55 with reference to the storage 21. The radio wave intensity indicated by the radio wave intensity information during connection may include both the radio wave intensity of the vehicle communicator 11 detected by the wireless transmitter-receiver 31 and the radio wave intensity of the wireless transmitter-receiver 31 detected by the vehicle communicator 11.

(3) In the above embodiment, the monitoring system 40 includes the radio wave data obtainer 45 and the connected transport vehicle data obtainer 46. The disclosure is not limited to such a structure. The monitoring system 40 may not include at least one of the radio wave data obtainer 45 or the connected transport vehicle data obtainer 46.

(4) The structure described in each of the above embodiments may be combined with any other structures described in the other embodiments unless any contradiction arises. This also applies to combinations of the embodiments described as other embodiments. The embodiments described herein are merely illustrative in all aspects also for other structures and may be modified variously as appropriate without departing from the spirit and scope of the disclosure.

Overview of Present Embodiment

The embodiments of the transport facility described above are outlined below.

The transport facility includes at least one transport vehicle that transports a transport article, a transport control device that communicates with the at least one transport vehicle to control the at least one transport vehicle, a communication system that allows communication between the at least one transport vehicle and the transport control device, and a monitoring system that monitors a status of the communication system. The communication system includes a plurality of wireless transmitter-receivers that wirelessly communicate with a vehicle communicator in the at least one transport vehicle. The communication system connects the plurality of wireless transmitter-receivers to the transport control device to allow communication with the transport control device. The monitoring system includes a travel data obtainer, a connection data obtainer, a display that displays information, and a controller. The travel data obtainer obtains travel data including position information and time information in a manner associated with each other. The position information indicates a position of the at least one transport vehicle. The time information indicates time. The connection data obtainer obtains connection data including connection destination information and the time information in a manner associated with each other. The connection destination information indicates a relationship between the vehicle communicator and a destination wireless transmitter-receiver to which the vehicle communicator is connected. The destination wireless transmitter-receiver is included in the plurality of wireless transmitter-receivers. The controller performs a display process of causing the display to display connection information based on the travel data and the connection data. The connection information indicates a relationship between the position of the at least one transport vehicle and the destination wireless transmitter-receiver to which the at least one transport vehicle is connected at the position.

This structure allows the position information included in the travel data and the connection destination information included in the connection data to be associated with each other based on the time information. The controller can thus generate the connection information based on such travel data and connection data. The connection information displayed on the display through the display process performed by the controller indicates the relationship between the position of the transport vehicle and the destination wireless transmitter-receiver to which the transport vehicle is connected at the position. Thus, a person viewing the display can easily track, as the actual status of communication between the transport vehicle and the wireless transmitter-receiver, the position of the connected transport vehicle and the wireless transmitter-receiver to which the transport vehicle is connected. The technique according to this structure allows easy tracking of the actual status of communication between the transport vehicle and the wireless transmitter-receiver.

The monitoring system may refer to transmitter-receiver position data indicating a position of each of the plurality of wireless transmitter-receivers. The controller may cause, in the display process, the display to display the connection information and connection distance information based on the travel data and the transmitter-receiver position data. The connection distance information may indicate a distance between the position of the at least one transport vehicle and the destination wireless transmitter-receiver to which the at least one transport vehicle is connected at the position.

In this structure, the connection distance information displayed on the display in addition to the connection information through the display process performed by the controller indicates the distance between the position of the transport vehicle and the destination wireless transmitter-receiver to which the transport vehicle is connected at the position. Thus, a person viewing the display can easily track the distance between the transport vehicle and the destination wireless transmitter-receiver, in addition to the position of the connected transport vehicle and the wireless transmitter-receiver to which the transport vehicle is connected.

The monitoring system may further include a radio wave data obtainer that obtains radio wave data including radio wave intensity information during connection and the time information in a manner associated with each other. The radio wave intensity information during connection may indicate an intensity of a communication radio wave during connection between each of the plurality of wireless transmitter-receivers and the vehicle communicator. The controller may cause, in the display process, the display to display the connection information and radio wave intensity information based on the travel data and the radio wave data. The radio wave intensity information may indicate a relationship between the position of the at least one transport vehicle and an intensity of a communication radio wave between the at least one transport vehicle at the position and the destination wireless transmitter-receiver.

In this structure, the radio wave intensity information displayed on the display in addition to the connection information through the display process performed by the controller indicates the position of the transport vehicle and the intensity of the communication radio wave between the transport vehicle at the position and the destination wireless transmitter-receiver. Thus, a person viewing the display can easily track the intensity of the communication radio wave between the transport vehicle and the destination wireless transmitter-receiver, in addition to the position of the connected transport vehicle and the wireless transmitter-receiver to which the transport vehicle is connected.

The monitoring system may refer to map data indicating a map of a travel path of the at least one transport vehicle. The controller may cause, in the display process, the display to display the map based on the map data and to display, on the map, a transport vehicle mark and a connection destination transmitter-receiver mark as the connection information. The transport vehicle mark may indicate the position of the at least transport vehicle. The connection destination transmitter-receiver mark may indicate the destination wireless transmitter-receiver to which the at least one transport vehicle is connected at the position.

In this structure, the display process performed by the controller causes the display to visually clearly display the position of the connected transport vehicle and the wireless transmitter-receiver to which the transport vehicle is connected.

In the structure described above in which the controller causes, in the display process, the display to display, on the map, the transport vehicle mark and the connection destination transmitter-receiver mark as the connection information, the controller may perform, in the display process, a reproduction display process of moving the transport vehicle mark on the map and changing the connection destination transmitter-receiver mark to correspond to the destination wireless transmitter-receiver changing with movement of the transport vehicle mark.

In this structure, the reproduction display process performed by the controller causes the display to visually clearly display changes of the destination wireless transmitter-receiver with movement of the transport vehicle.

In the transport facility with each of the above structures, the at least one transport vehicle may include a plurality of transport vehicles. The monitoring system may further include a connected transport vehicle data obtainer that obtains connected transport vehicle data including transport vehicle specifying information and the time information in a manner associated with each other. The transport vehicle specifying information may specify, among the plurality of transport vehicles, a transport vehicle connected to each of the plurality of wireless transmitter-receivers. The controller may perform a first graph display process of causing the display to display a graph based on the connected transport vehicle data. The graph may indicate a number of transport vehicles connected to each of the plurality of wireless transmitter-receivers within a set period.

In this structure, the first graph display process performed by the controller causes the display to display the graph indicating the number of transport vehicles connected to each of the multiple wireless transmitter-receivers within a set period. Thus, a person viewing the display can easily track any imbalance or the degree of imbalance in the number of connected transport vehicles among the multiple wireless transmitter-receivers.

The at least one transport vehicle may include a plurality of transport vehicles. The monitoring system may further include a radio wave data obtainer that obtains radio wave data including radio wave intensity information during connection and the time information in a manner associated with each other. The radio wave intensity information during connection may indicate an intensity of a communication radio wave during connection between each of the plurality of wireless transmitter-receivers and the vehicle communicator in each of the plurality of transport vehicles. The controller may perform a second graph display process of causing the display to display a graph based on the radio wave data. The graph may indicate a radio wave intensity indicated by the radio wave intensity information during connection within a set period for each of the plurality of wireless transmitter-receivers.

In this structure, the second graph display process performed by the controller causes the display to display the graph indicating the radio wave intensity within a set period for each of the multiple wireless transmitter-receivers. Thus, a person viewing the display can easily track any imbalance or the degree of imbalance in the radio wave intensity among the multiple wireless transmitter-receivers.

The at least one transport vehicle may include a plurality of transport vehicles. The monitoring system may further include a connected transport vehicle data obtainer and a radio wave data obtainer. The connected transport vehicle data obtainer may obtain connected transport vehicle data including transport vehicle specifying information and the time information in a manner associated with each other. The transport vehicle specifying information may specify, among the plurality of transport vehicles, a transport vehicle connected to each of the plurality of wireless transmitter-receivers. The radio wave data obtainer may obtain radio wave data including radio wave intensity information during connection and the time information in a manner associated with each other. The radio wave intensity information during connection may indicate an intensity of a communication radio wave during connection between each of the plurality of wireless transmitter-receivers and the vehicle communicator in each of the plurality of transport vehicles. The controller may perform a faulty transmitter-receiver display process of causing the display to display, among the plurality of wireless transmitter-receivers, a wireless transmitter-receiver with at least one of a number of transport vehicles connected within a set period or a radio wave intensity indicated by the radio wave intensity information during connection within the set period being less than a predetermined determination threshold value.

In this structure, when any radio transmitter-receiver (hereafter referred to as a faulty transmitter-receiver) has at least one of the number of connected transport vehicles or the radio wave intensity being less than the threshold value, the faulty transmitter-receiver display process performed by the controller causes the display to display the faulty transmitter-receiver. Thus, a person viewing the display can easily track any faulty transmitter-receiver, and can quickly respond to the faulty transmitter-receiver by, for example, restarting the system.

The transport facility according to one or more embodiments of the disclosure produces at least one of the effects described above.

What is claimed is:

1. A transport facility, comprising: at least one transport vehicle configured to transport a transport article; a transport control device configured to communicate with the at least one transport vehicle to control the at least one transport vehicle; a communication system configured to allow communication between the at least one transport vehicle and the transport control device; and a monitoring system configured to monitor a status of the communication system, and wherein: the communication system comprises a plurality of wireless transmitter-receivers distributed throughout an area in which the transport vehicle travels, each transmitter-receiver of the plurality of wireless transmitter-receivers defining a communication area, the plurality of wireless transmitter receivers configured to wirelessly communicate with a vehicle communicator in the at least one transport vehicle, the communication system configured to connect the plurality of wireless transmitter-receivers to the transport control device to allow communication with the transport control device, the monitoring system comprises a travel data obtainer, a connection data obtainer, a display configured to display information, and a controller, the travel data obtainer is configured to obtain travel data comprising position information and time information in a manner associated with each other, the position information indicating a position of the at least one transport vehicle, the time information indicating time, the connection data obtainer is configured to obtain connection data comprising connection destination information and the time information in a manner associated with each other, the connection destination information indicating a relationship between the vehicle communicator and a destination wireless transmitter-receiver to which the vehicle communicator is connected based on the transport vehicle being within the communication area of the destination wireless transmitter-receiver, and the destination wireless transmitter-receiver is included in the plurality of wireless transmitter-receivers, the connection destination information comprises transmitter-receiver specifying information identifying the destination wireless transmitter-receiver to which the vehicle communicator is connected, and the controller is configured to perform a display process of causing the display to display connection information based on the travel data and the connection data, the connection information indicating a relationship between the position of the at least one transport vehicle and the destination wireless transmitter-receiver to which the at least one transport vehicle is connected at the position; wherein: the monitoring system is configured to refer to map data indicating a map of a travel path of the at least one transport vehicle, the controller causes, in the display process, the display to display the map based on the map data and to display, on the map, a first mark indicating a position of at least one particular wireless transmitter-receiver among the plurality of wireless transmitter-receivers and a second mark indicating a position of the at least one transport vehicle as the connection information, and the controller causes, in the display process, the display to display a connected transport vehicle among the at least one transport vehicle, the connected transport vehicle being connected to the at least one particular wireless transmitter-receiver, in a manner different from a manner in which the display displays an unconnected transport vehicle among the at least one transport vehicle.

2. The transport facility according to claim 1, wherein: the monitoring system is configured to refer to transmitter-receiver position data indicating a position of each of the plurality of wireless transmitter-receivers, and the controller causes, in the display process, the display to display the connection information and connection distance information based on the travel data and the transmitter-receiver position data, and the connection distance information indicates a distance between the position of the at least one transport vehicle and the destination wireless transmitter-receiver to which the at least one transport vehicle is connected at the position.

3. The transport facility according to claim 1, wherein: the monitoring system further comprises a radio wave data obtainer configured to obtain radio wave data comprising radio wave intensity information during connection and the time information in a manner associated with each other, and the radio wave intensity information during connection indicates an intensity of a communication radio wave during connection between each of the plurality of wireless transmitter-receivers and the vehicle communicator, and the controller causes, in the display process, the display to display the connection information and radio wave intensity information based on the travel data and the radio wave data, and the radio wave intensity information indicates a relationship between the position of the at least one transport vehicle and an intensity of a communication radio wave between the at least one transport vehicle at the position and the destination wireless transmitter-receiver.

4. The transport facility according to claim 1, wherein: the monitoring system is configured to refer to map data indicating a map of a travel path of the at least one transport vehicle, and the controller causes, in the display process, the display to display the map based on the map data and to display, on the map, a transport vehicle mark and a connection destination transmitter-receiver mark as the connection information, the transport vehicle mark indicates the position of the at least transport vehicle, and the connection destination transmitter-receiver mark indicates the destination wireless transmitter-receiver to which the at least one transport vehicle is connected at the position.

5. The transport facility according to claim 4, wherein: the controller performs, in the display process, a reproduction display process of moving the transport vehicle mark on the map and changing the connection destination transmitter-receiver mark to correspond to the destination wireless transmitter-receiver changing with movement of the transport vehicle mark.

6. The transport facility according to claim 1, wherein: the at least one transport vehicle comprises a plurality of transport vehicles, the monitoring system further comprises a connected transport vehicle data obtainer configured to obtain connected transport vehicle data comprising transport vehicle specifying information and the time information in a manner associated with each other, and the transport vehicle specifying information specifies, among the plurality of transport vehicles, a transport vehicle connected to each of the plurality of wireless transmitter-receivers, and the controller performs a first graph display process of causing the display to display a graph based on the connected transport vehicle data, and the graph indicates a number of transport vehicles connected to each of the plurality of wireless transmitter-receivers within a set period.

7. The transport facility according to claim 1, wherein the at least one transport vehicle comprises a plurality of transport vehicles, the monitoring system further comprises a radio wave data obtainer configured to obtain radio wave data comprising radio wave intensity information during connection and the time information in a manner associated with each other, and the radio wave intensity information during connection indicates an intensity of a communication radio wave during connection between each of the plurality of wireless transmitter-receivers and the vehicle communicator in each of the plurality of transport vehicles, and the controller performs a second graph display process of causing the display to display a graph based on the radio wave data, and the graph indicates a radio wave intensity indicated by the radio wave intensity information during connection within a set period for each of the plurality of wireless transmitter-receivers.

8. The transport facility according to claim 1, wherein: the at least one transport vehicle comprises a plurality of transport vehicles, the monitoring system further comprises a connected transport vehicle data obtainer and a radio wave data obtainer, the connected transport vehicle data obtainer obtains connected transport vehicle data comprising transport vehicle specifying information and the time information in a manner associated with each other, and the transport vehicle specifying information specifies, among the plurality of transport vehicles, a transport vehicle connected to each of the plurality of wireless transmitter-receivers, the radio wave data obtainer obtains radio wave data comprising radio wave intensity information during connection and the time information in a manner associated with each other, and the radio wave intensity information during connection indicates an intensity of a communication radio wave during connection between each of the plurality of wireless transmitter-receivers and the vehicle communicator in each of the plurality of transport vehicles, and the controller performs a faulty transmitter-receiver display process of causing the display to display, among the plurality of wireless transmitter-receivers, a wireless transmitter-receiver with at least one of a number of transport vehicles connected within a set period or a radio wave intensity indicated by the radio wave intensity information during connection within the set period being less than a predetermined determination threshold value.

9. The transport facility according to claim 1, wherein: the monitoring system is configured to refer to map data indicating a map of a travel path of the at least one transport vehicle, the controller causes, in the display process, the display to display the map based on the map data and to display, on the map, a transport vehicle mark and a connection destination transmitter-receiver mark as the connection information, the transport vehicle mark indicates the position of at least one particular transport vehicle among the at least one transport vehicle, and the connection destination transmitter-receiver mark indicates the destination wireless transmitter-receiver to which the at least one particular transport vehicle is connected at the position, and the controller performs, in the display process, a reproduction display process of moving the transport vehicle mark on the map along the travel path traveled by the at least one particular transport vehicle and changing the connection destination transmitter-receiver mark to correspond to the destination wireless transmitter-receiver changing with movement of the transport vehicle mark.

10. The transport facility according to claim 9, wherein: the controller causes, in the reproduction display process, the display to indicate, with the connection destination transmitter-receiver mark, only the wireless transmitter-receiver to which the at least one particular transport vehicle is connected, to change the connection destination transmitter-receiver mark to correspond to the destination wireless transmitter-receiver changing with movement of the transport vehicle mark.

11. The transport facility according to claim 1, wherein: the controller performs, in the display process, a reproduction display process of moving the second mark on the map along the travel path traveled by the at least one transport vehicle and indicating the connected transport vehicle and the unconnected transport vehicle with respective marks different from each other to change the second mark to correspond to a status of connection with the at least one particular wireless transmitter-receiver changing with movement of the second mark.

* * * * *